July 14, 1925.

M. MANN

GATE

Filed Jan. 18, 1924   3 Sheets-Sheet 1

1,546,300

Moses Mann.
INVENTOR

WITNESS:

BY Victor J. Evans
ATTORNEY

July 14, 1925.
M. MANN
GATE
Filed Jan. 18, 1924
1,546,300
3 Sheets-Sheet 2
*Fig. 3.*
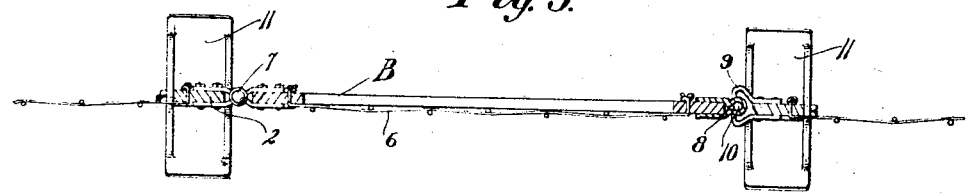
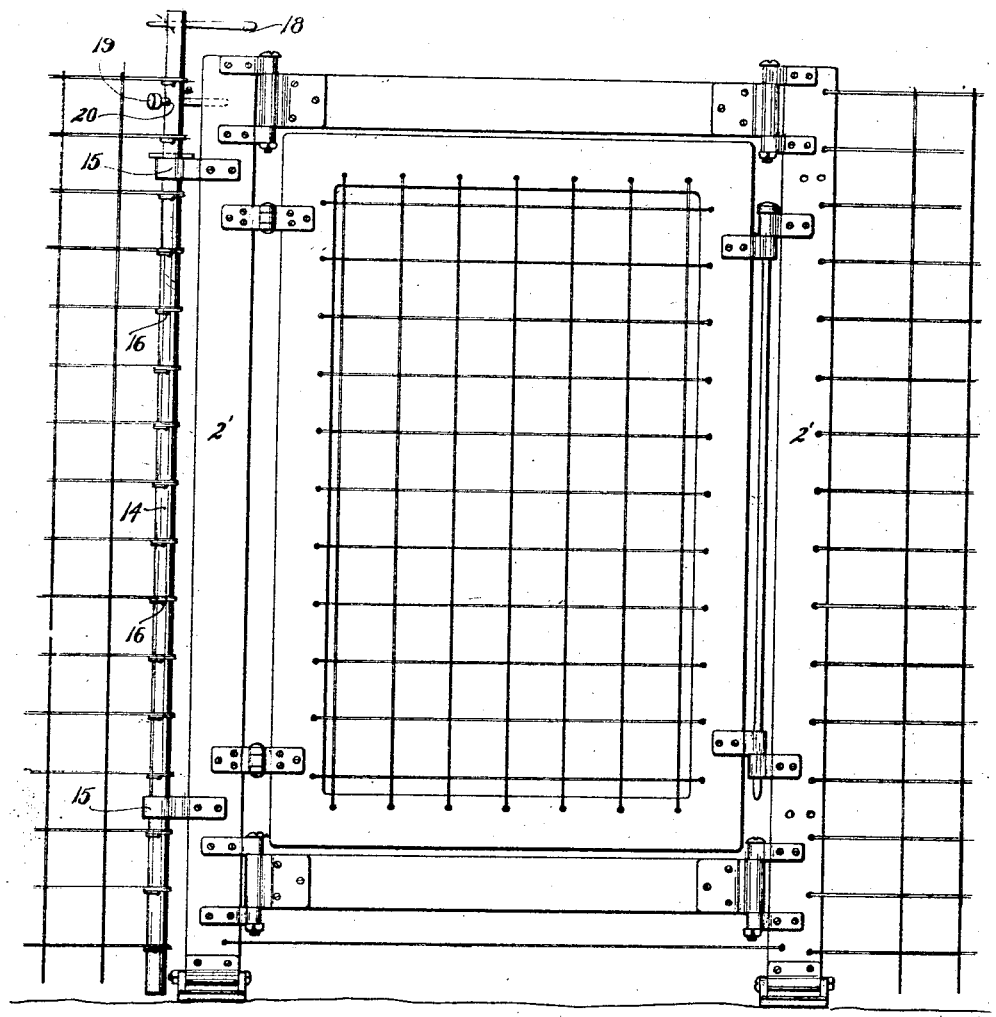
*Fig. 4.*
Moses Mann.
INVENTOR July 14, 1925.                                                    1,546,300
M. MANN
GATE
Filed Jan. 18, 1924              3 Sheets-Sheet 3
*Fig. 5.*
*Fig. 6.*
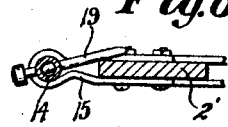
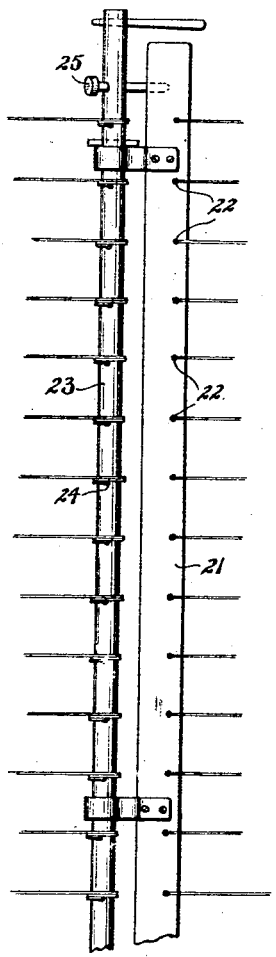
*Fig. 7.*
*Fig. 8.*
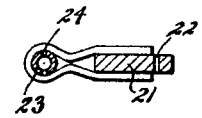
*Fig. 9.*
Moses Mann,
INVENTOR
BY *Victor J. Evans*
ATTORNEY
WITNESS:

Patented July 14, 1925.

UNITED STATES PATENT OFFICE.

MOSES MANN, OF GALLATIN, MISSOURI.

GATE.

Application filed January 18, 1924. Serial No. 687,135.

*To all whom it may concern:*

Be it known that I, MOSES MANN, a citizen of the United States, residing at Gallatin, in the county of Daviess and State of Missouri, have invented new and useful Improvements in Gates, of which the following is a specification.

This invention relates to improvements in gates, the general object of the invention being to provide means for placing a gate in a fence line in such a manner that it is not necessary to use posts.

Another object of the invention is to provide means, associated with the gate, for applying tension to the fence wires.

With the above and other objects in view, the invention further includes the following novel features and details of construction, to be hereinafter more fully described, illustrated in the accompanying drawings and pointed out in the appended claims.

In the drawings:—

Figure 3 is a section on the line 3—3 of Figure 1.

Figure 4 is a view of the fence showing another form of the invention in use.

Figures 5 and 6 are detail views of this form.

Figures 7, 8 and 9 are views of still another form.

Figures 1, 2:
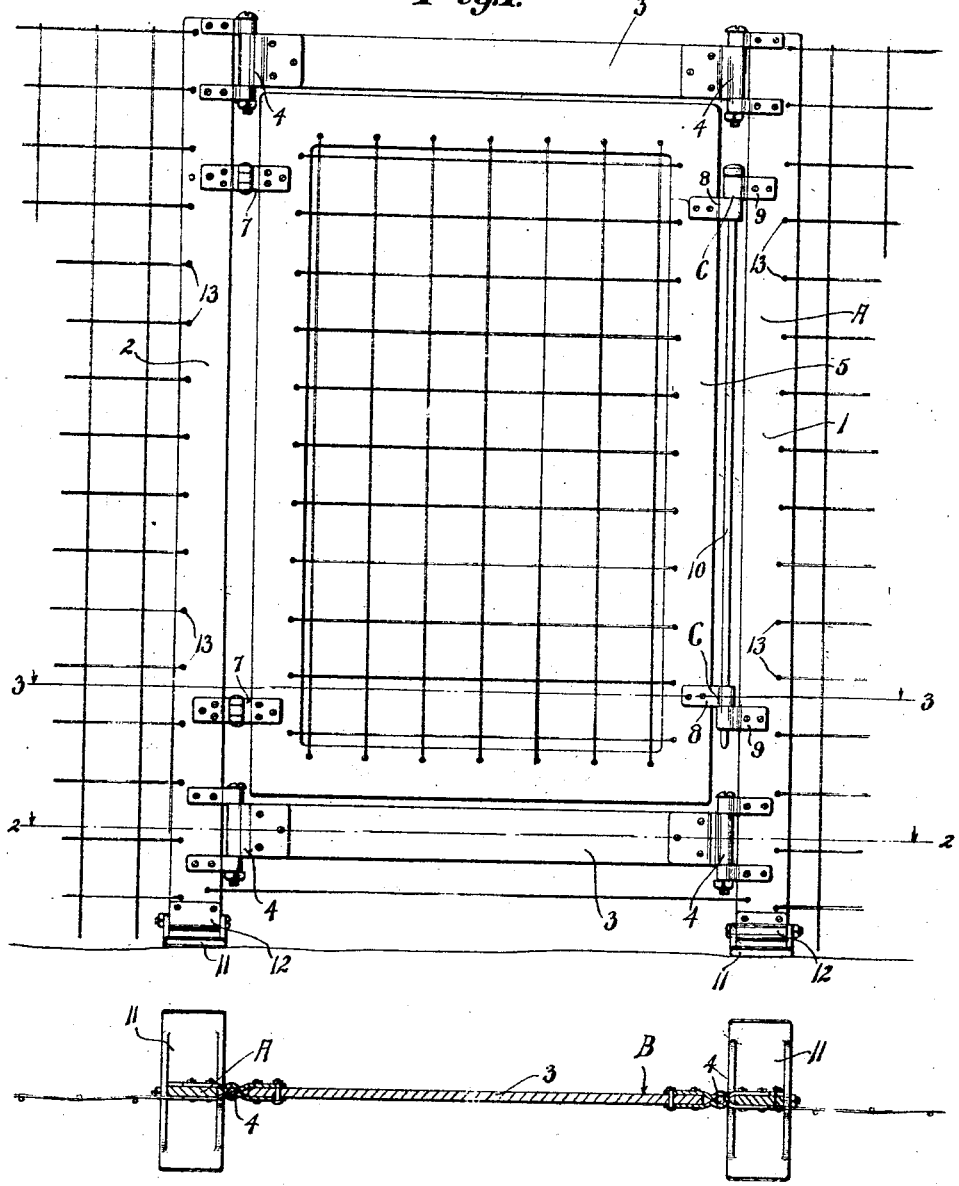
Figure 1 is a view of a fence showing the simplest form of my invention in use.
Figure 2 is a section on the line 2—2 of Figure 1.

Referring to the first form of the invention A indicates a gate frame which comprises the side pieces 1 and 2 and the end pieces 3 which are hingedly connected with the side pieces by the hinges 4 so that the gate frame is flexible. The gate B comprises a frame 5 and the wires 6. The frame 5 is connected to one of the side pieces of the frame A by the hinges 7 and it is connected with the other side piece by the fastening means C which comprises the looped members 8 on the gate B, the looped members 9 on the frame A and the rod 10 which passes through the looped members. The members 9 have their looped ends enlarged so that the rod can be placed in engagement with the same from either side of the gate. Channel-shaped shoes 11 are connected with the lower ends of the side pieces 1 and 2 by the hinges 12 so that the gate frame A is movably supported on the ground so that the gate structure can have limited movement when the fence is pressed upon by cattle or the like. This will prevent damage to the gate parts. The ends of the wires of the fence B, which is cut at the point where the gate is to be located, are threaded through holes 13 formed in the side pieces of the frame A so that when the fence is stretched the gate will be held in position by the tension upon the wires. The shoes also support the gate. The portion of the fence cut for the gate can be used on the frame B.

From the foregoing it will be seen that my gate structure can be easily and quickly placed in postion as no posts are used.

In the modification I provide means for stretching the fence, such means consisting of a pipe 14 which is connected with the side piece 2′ of the gate frame by the loop-shaped hinges 15. This pipe is provided with holes 16 for receiving the ends of the wires and a large hole 17 at its upper end for receiving a lever 18 so that the pipe can be rotated to wind the wires thereupon and thus stretch the fence. The pipe is held against retrograde movement by means of the pin 19 which is inserted in a hole 20 formed in the pipe and which is adapted to engage the side piece 2′ to prevent turning movement of the pipe.

This attachment permits the fence to be stretched after the gate has been put in place. In other respects this form of the invention is similar to that first described.

In the modification shown in Figures 7, 8 and 9 the device is shown for taking up slack in the fence without detaching the fence wires from the posts. This device comprises a strip 21 which is provided with holes 22 to receive the ends of the wires of the cut portion of the fence and a pipe 23 which is provided with holes 24 to receive the wires of the other portion of the fence. This pipe is connected to the strip in the same manner as the pipe shown in the second form of the invention and is similarly costructed so that it can be rotated to wrap the wires around the same and thus stretch the fence to take up slack therein.

In using this device the fence is cut and the ends of the cut portions fastened to the strip 21 and the pipe 23 and then the pipe is rotated to stretch the two portions.

The pipe is held in adjusted position by the pin 25.

The flexibility of the gate frame and the shoes 11 will prevent it from being bent or sprung by stock pushing against the fence, and the gate will always open freely.

The invention is susceptible of various other changes in its form, proportions and minor details of construction and the right is herein reserved to make such changes as properly fall within the scope of the appended claims.

Having described the invention what is claimed is:—

1. In combination with a fence, a gate structure comprising a gate frame, means for connecting the fence wires to the side pieces of the gate frame and a gate hingedly connected with the frame, said gate frame having its end pieces hingedly connected with the side pieces and shoes hingedly connected with the lower ends of the side pieces.

2. A gate structure comprising a pair of side pieces, means for attaching the fence wires thereto, end pieces hingedly connected with the side pieces, shoes hinged to the lower ends of the side pieces, a gate hinged to one side piece and fastening means for connecting the gate to the other side piece, such means comprising loops on the side piece and on the gate and a rod for engaging the loops, the loops on the side piece being enlarged so that the rod can be inserted from either side of the gate.

In testimony whereof I affix my signature.

MOSES MANN.